United States Patent [19]

Ikeda et al.

[11] Patent Number: 4,952,279
[45] Date of Patent: Aug. 28, 1990

[54] PAPERMAKING METHOD

[75] Inventors: Hisao Ikeda; Fumio Suzuki; Yoshitane Watanbe; Mitsunobu Matsumura; Yasuhiro Takahashi; Hiroshi Murakami; Koichi Maeda, all of Funabashi, Japan

[73] Assignee: Nissan Chemical Industries Ltd., Tokyo, Japan

[21] Appl. No.: 289,550

[22] Filed: Dec. 23, 1988

Related U.S. Application Data

[62] Division of Ser. No. 147,851, Jan. 25, 1988, Pat. No. 4,840,705.

[30] Foreign Application Priority Data

Feb. 2, 1987 [JP] Japan ................... 62-22092

[51] Int. Cl.$^5$ ............. D21H 17/29; C08B 31/08
[52] U.S. Cl. ..................... 162/175; 536/50; 536/111
[58] Field of Search ............... 162/175, 181.1, 181.6; 536/49.50, 108, 111

[56] References Cited

U.S. PATENT DOCUMENTS 2,876,217 3/1959 Paschall ........................... 536/50
4,385,961 5/1983 Svending et al. ............... 162/181.6

FOREIGN PATENT DOCUMENTS 55-6587 1/1980 Japan .
55-12824 1/1980 Japan .
57-51900 3/1982 Japan .

*Primary Examiner*—Peter Chin
*Attorney, Agent, or Firm*—Oliff & Berridge

[57] ABSTRACT

Disclosed are a papermaking method comprising the steps of sheet-formation of an aqueous papermaking stock which contains a cellulose fiber or the said fiber and an inorganic filler, dewatering and drying, charaacterized by the addition of a starch ether derivative of a general formula (I):

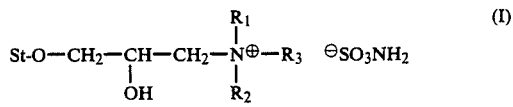

where St—O represents a starch molecule residue, $R_1$, $R_2$ and $R_3$ independently represent an alkyl group having from 1 to 18 carbon atoms or a benzyl group, provided that two or more of these $R_1$, $R_2$ and $R_3$ must not be a benzyl group or an alkyl group having from 5 to 18 carbon atoms at the same time, and any two of these $R_1$, $R_2$ and $R_3$ may be bonded to form a cyclic structure, the said derivative containing the ether bond preferably in a degree of substitution of from 0.01 from 0.1, to the said papermaking stock in an amount of from 0.05 to 5.0% by weight of the cellulose fiber or the total of the said fiber and the inorganic filler in the said stock, as well as the said starch ether derivative of the formula (I) and a method for preparation of the said derivative.

8 Claims, 1 Drawing Sheet

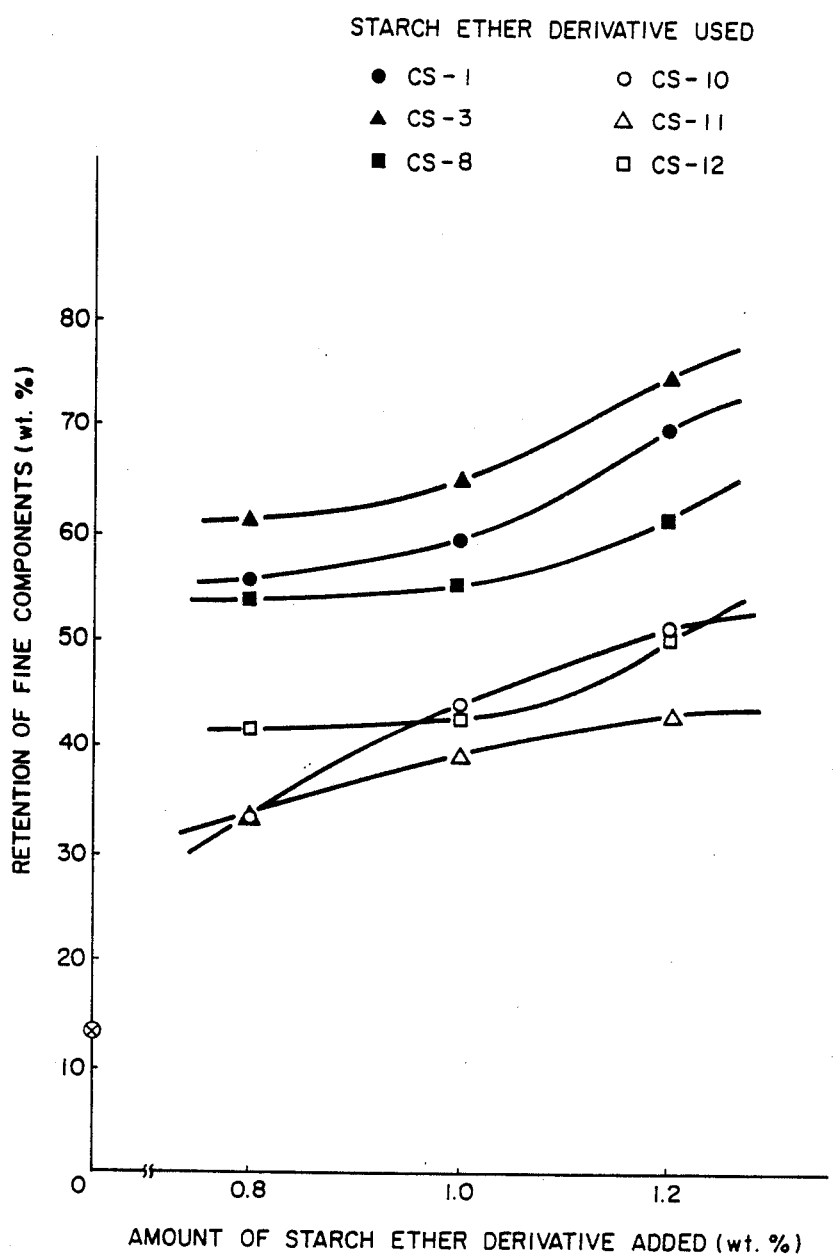

PAPERMAKING METHOD

This is a Division of application Ser. No. 07/147,851 filed Jan. 25, 1988 now U.S. Pat. No. 4,840,705.

BACKGROUND OF THE INVENTION

The present invention relates to improvement of a method of making a paper consisting essentially of a cellulose fiber or the said fiber and an inorganic filler, and in particular, to a papermaking method in which the retention of the cellulose fiber and the inorganic filler, especially fines thereof, in the sheet-formation step is extremely improved and the drainage in the said step is also elevated and additionally the paper strength of the dried sheet is improved.

More particularly, the present invention relates to improvement of a papermaking method, in which a cationic starch ether derivative which is characteristically in the form of a sulfamic acid salt itself is added to an aqueous papermaking stock containing a cellulose fiber or the said fiber and an inorganic filler, prior to the sheet-formation step of the method.

A paper which consists essentially of a cellulose fiber or the said fiber and an inorganic filler is, in general, prepared by a method comprising the step of feeding an aqueous papermaking stock obtained by dispersing and beating a cellulose pulp in water and adjusting the concentration of the resulting slurry and optionally adding a filler and any other additives thereto, to a sheet-formation machine, and the subsequent steps of dewatering and drying the resulting sheet. It is, however, an important fact that a pulp of high quality is lacking for the paper manufacturing, and the amounts of use of a pulp of low quality so as to compensate it and also of the inorganic filler are increasing for the purpose of lowering the manufacturing cost of paper. Hence the improvement of the retention and of the drainage in the sheet-formation step to enhance the productivity, the improvement of the product paper quality, etc. in the manufacturing of paper have been more and more desired.

In order to improve the retention in the sheet-formation step, a method of adding an aluminium sulfate as a coagulant to a papermaking stock has been carried out. In this method, however, the papermaking stock is required to be made acidic, prior to being subjected to the sheet-formation step. By reason of such matter, the durability of the final product paper would become lowered, the re-use of the white water would become difficult, the apparatus used would be corroded, and further the filler to be used is limitative as calcium carbonate cannot be used.

U.S. Pat. No. 2,876,217 has proposed to add a cationic starch in the form of a hydrochloric acid salt to a papermaking raw material dispersion. This is, however, still insufficient in the point of both the improvement of the retention in the sheet-formation step and the improvement of the strength of the paper product.

Japanese patent application (OPI) No. 6587/80 (the term "OPI" as used herein means a "published unexamined Japanese patent application") illustrates to add a combination comprising a cationic component such as a cationic starch, an acrylamide copolymer, etc. and an anionic component such as a natural starch, a carboxymethylated starch, etc., to a papermaking stock prior to the sheet-formation step. However, this is silent about the use of a cationic starch in the form of a sulfamic acid salt.

Japanese patent application (OPI) No. 12824/80 also illustrates a method of adding a combination of a cationic resin emulsion and an anionic water-soluble polymer, to a papermaking stock. However, the conventional cationic starch which has hitherto been utilized in the prior art is in the form of a hydrochloric acid salt. If this is used in the papermaking method as illustrated in Japanese patent application (OPI) No. 6587/80, the drainage in the sheet-formation step is insufficient and therefore the productivity is poor and additionally the paper quality of the final product is low. Even by the method as illustrated in Japanese patent application (OPI) No. 12824/80, the drainage and the paper quality of the final product are not satisfactory because of the same reason as above.

Japanese patent application (OPI) No. 51900/82 illustrates a papermaking method in which a combination of a cationic starch in the form of a hydrochloric acid salt and an anionic aqueous silicasol is added to an aqueous papermaking stock and the resulting dispersion is subjected to the sheet-formation step. According to the said method, the drainage and the paper quality of the final product are fairly good, but the retention in the sheet-formation step would still be insufficient in some cases depending upon the sheet-formation conditions. In particular, the retention of the inorganic filler would often be lowered, because of the addition of the cationic starch in the form of a hydrochloric acid salt.

SUMMARY OF THE INVENTION

One object of the present invention is to provide a papermaking method in which an aqueous papermaking stock containing a cellulose fiber or the said fiber and an inorganic filler and falling within an acidic region of pH 4 or more or within a weak alkaline to neutral region of pH 10 or less is subjected to sheet-formation, dewatering and drying, and which attains improvements of the retention of the cellulose fiber or said cellulose fiber and inorganic filler, especially fines thereof, and the drainage rate in the sheet-formation step, the dewatering speed, the drying speed, the strength and the uniformity of the final product paper, etc.

Another object of the present invention is to provide additives to the aqueous papermaking stock which attains the said improvement, as well as a method for the preparation of the additives.

Specifically, the present invention provides a papermaking method comprising the steps of sheet-formation of an aqueous papermaking stock which contains a cellulose fiber or the said fiber and an inorganic filler dewatering and drying, which is characterized by the addition of a starch ether derivative of a general formula (I):

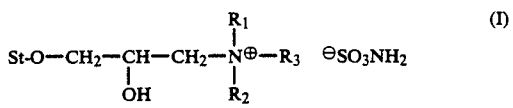

where St—O represents a starch molecule residue, $R_1$, $R_2$ and $R_3$ independently represent an alkyl group having from 1 to 18 carbon atoms or a benzyl group, provided that two or more of these $R_1$, $R_2$ and $R_3$ must not be a benzyl group or an alkyl group having from 5 to 18 carbon atoms at the same time, and any two of these $R_1$, R2 and R3 may be bonded to form a cyclic structure, the said derivative containing the ether bond preferably n a substitution degree of from 0.01 to 0.1, to the said papermaking stock in an amount of from 0.05 to 5.0% by weight of the cellulose fiber or the total of the said fiber and the inorganic filler in the said stock.

BRIEF DESCRIPTION OF THE DRAWING

FIG. 1 shows a graph of the relation between Retention of fine component (wt. %) and Amount of starch ether derivative added (wt. %).

DETAILED DESCRIPTION OF THE INVENTION

As the additive to the papermaking stock for use in the papermaking method of the present invention, a preferred one which can yield a better result comprises one part by weight of a cationic starch ether derivative of the above-mentioned formula (I) which has an ether bond in a degree of substitution of from 0.01 to 0.10 and which is in the form of a sulfamic acid salt and from 0.002 to 20 parts by weight of an anionic aqueous silica sol (as $SiO_2$), a bentonite, a water-soluble anionic polymer or a mixture thereof.

The cationic starch ether derivative for use in the present invention, which is in the form of a sulfamic acid salt and which attains the improvement, can be obtained by reaction of a quaternary ammonium sulfamate of a general formula (II):

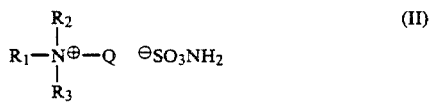

(II)

where Q represents a 2,3-epoxypropyl group or a 3-halo-2-hydroxypropyl group; and $R_1$, $R_2$ and $R_3$ have the same meanings as mentioned above, and a starch.

Among the sulfamates of the above-mentioned formula (II), those where Q represents a 3-halo-2-hydroxypropyl group, or that is, quaternary ammonium sulfamates represented by a general formula (IV):

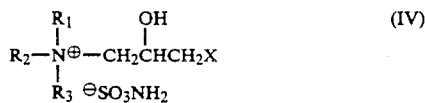

(IV)

where X represents a halogen atom; and $R_1$, $R_2$ and $R_3$ have the same meanings as mentioned above, can be obtained by reaction of a sulfamic acid salt of a tertiary amine of a general formula (III):

(III)

where $R_1$, $R_2$ and $R_3$ have the same meanings as above, can be obtained by reaction of a quaternary ammonium sulfamate of the above-mentioned formula (IV)

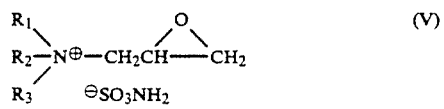

(V)

and an alkali metal hydroxide, in water or in a mixed solvent comprising water and a water-soluble organic solvent.

In the improvement of the papermaking method of the present invention, a more preferred improvement can be attained by a further addition of an anionic silica sol (as $SiO_2$), a bentonite or a water-soluble anionic polymer in the papermaking stock in an amount of from 0.01 to 5.0% by weight of the cellulose fiber or the total of the said fiber and the inorganic filler in the said stock, in addition to the addition of the above-mentioned cationic starch which is in the form of a sulfamic acid salt.

The present invention will be explained in greater detail hereinafter.

The cellulose fiber for use in the papermaking method of the present invention is one obtained by beating a cellulose pulp which is generally used in a conventional papermaking method, with a beater or the like. The cellulose pulp may be anyone of chemical pulps, mechanical pulps, thermomechanical pulps, groundwood pulps, etc. In addition, used papers can also be used for partial substitution for the said new pulps.

The inorganic filler for use in the present invention may be anyone of conventional papermaking mineral fillers, for example, including kaolin (china clay), terra alba, titanium dioxide, anionic heavy calcium carbonate, light calcium carbonate, calcined clay, wollastonite, synthetic silica, talc, aluminium hydroxide, mineral fiber, glass fiber, pearlite, etc.

The papermaking stock for use in the present invention comprises the above-mentioned conventional papermaking cellulose fiber or the said fiber and the above-mentioned inorganic filler as dispersed in water. The inorganic filler is preferably added to the stock in an amount of 150% by weight or less to the cellulose fiber in the final product paper, but the content of the said filler may be higher than the said proportion. Also in the method of the present invention, the concentration of the cellulose fiber in the papermaking stock may be same as that of the cellulose fiber in the papermaking stock for conventional papermaking method. The papermaking stock for use in the present invention can contain any sizing agent, fixing agent, de-foaming agent, slime-controlling agent, dye and other additives, provided that the object of the present invention can be attained. As the papermaking stock, that having a pH range of from 4 to 10 can be applied to the method of the present invention.

The anionic silica sol for use in the present invention is a dispersion comprising a colloidal silica having a particle size of from 2 to 10 milimicrons (m$\mu$), as dispersed in water, and this can be produced in a conventional method. Such silica sol may be either acidic or alkaline, and in general, a stable one can be obtained as a product containing 30% by weight or less $SiO_2$. For use in the present invention, an alkaline silica sol, which has a high storage stability, is preferred, and the $SiO_2$ concentration is adjusted by adequate dilution with water, for convenient use.

Preferred water-soluble anionic polymers for use in the present invention include known anionic polyacrylamides, sodium polyacrylates, sulfonic acid group-containing melamine-formaldehyde condensation product salts, etc., and additionally, copolymers of an acrylate or methacrylate and an acrylic acid can also be used in the present invention. Preferably those polymers are used in a form of an aqueous solution. Also, the bentonite for use in the present invention may be any conventional one.

The cationic starch ether derivative for use in the present invention, which is in the form of a sulfamic acid salt, can be obtained by first reacting a sulfamic acid salt of a tertiary amine of the above-mentioned formula (III) with an epihalohydrin to form a 3-halo-2-hydroxypropyl group-containing quaternary ammonium sulfamate of the above-mentioned formula (IV), or reacting the said quaternary ammonium sulfamate with an alkali metal hydroxide to form a 2,3-epoxypropyl group-containing quaternary ammonium sulfamate of the above-mentioned formula (V), and then reacting the said quaternary ammonium sulfamate with a starch.

The amine represented by the above-mentioned formula (III) shows a tendency to lower the solubility in water or water-soluble organic solvents, etc. with increase of the number of the carbon atoms in the substituents $R_1$, $R_2$ and $R_3$, and the substituents $R_1$, $R_2$ and $R_3$ preferably include a methyl group, an ethyl group, a propyl group, a butyl group or the like having 4 or less carbon atoms. However, if any two of these $R_1$, $R_2$ and $R_3$ are the above-mentioned lower alkyl groups, the last one may be an alkyl group having from 5 to 18 carbon atoms or a benzyl group. In addition, any two of these $R_1$, $R_2$ and $R_3$ may form a ring structure, for example, a 5-membered or 6-membered ring, and examples of such compounds are N-alkylpiperidines in which the alkyl group has 18 or less carbon atoms, such as N-methylpiperidine, N-ethylpiperidine, etc., as well as N-benzylpiperidine, etc. Examples of especially preferred tertiary amines are trimethylamine, triethylamine, tri-n-propylamine, tri-n-butylamine, dimethylmonoethylamine, dimethyl-monobutylamine, dimethyl-monoisopropylamine, dimethyl-n-octylamine, dimethylbenzylamine, N-methylpiperidine, etc.

The sulfamic acid salt of the said tertiary amine for use in the present invention can easily be prepared in a conventional manner. For instance, the above-mentioned tertiary amine and a sulfamic acid are added, in a proportion of nearly equimolar amounts, to water or a mixed solvent comprising water and a water-soluble organic solvent, whereby the intended salt is obtained in the form of a neutral to weak alkaline solution. The water-soluble organic solvent is not specifically limitative, but, for example, conventional alcohol, keton, ether, etc. such as methanol, ethanol, isopropanol, n-propanol, acetone, methyl ethyl ketone, methyl isobutyl ketone, dioxane, tetrahydrofurane, monomethyl ether of ethylene glycol can be used. When a tertiary amine with a larger carbon number is used, the said solvent is used in the form of a mixture with water.

The quaternary ammonium sulfamate represented by the above-mentioned formula (IV) can be obtained by reacting a sulfamic acid salt of the above-mentioned tertiary amine with an epihalohydrin. The reaction is generally carried out in water or in a mixed solvent comprising water and the above-mentioned water-soluble organic solvent. As the epihalohydrin which can be used in the reaction, there may be mentioned epichlorohydrin, epibromohydrin, epiiodohydrin, etc., and epichlorohydrin is preferred in view of the reactivity and cost thereof, etc.

The said reaction can be carried out at normal temperature of from 10° to 30° C. or so within from 1 to 2 hours, but as the case may be, the temperature can be elevated further.

As mentioned above, the quaternary ammonium sulfamate of the formula (IV) is generally formed in the form of a solution, but if necessary, the solution can further be purified to isolate a 3-halo-2-hydroxypropyl-quaternary ammonium sulfamate from the solvent.

The 2,3-epoxypropyl group-containing quaternary ammonium sulfamate as represented by the above-mentioned formula (V) is obtained by reacting the 3-halo-2-hydroxypropyl-quaternary ammonium sulfamate of the above-mentioned formula (IV) with an alkali hydroxide in a solvent. The alkali hydroxide to be used in the reaction includes sodium hydroxide, potassium hydroxide, calcium hydroxide, magnesium hydroxide, etc., and sodium hydroxide is preferred among them in view of the reactivity, easy handling and cost thereof, etc. Preferred examples of the solvent for use in the reaction include water and a mixed solvent comprising water and a water-soluble orgnaic solvent, etc. Preferred examples of the water-soluble organic solvents may be the same as those mentioned above. The reaction preferably proceeds at a pH range of from 11.8 to neutral. The reaction temperature may be normal temperature of from 10° to 30° C. or so, but as the case may be, the temperature can be elevated further. The reaction can be finished, in general, within from 1 to 2 hours.

As mentioned above, the 2,3-epoxypropyl group-containing quaternary ammonium sulfamate having the above-mentioned formula (V) can be obtained in the form of a solution, but if necessary, the solution can further be purified so as to recover the said compound from the solvent to give a pure product.

The starch, which is a raw material of the cationic starch ether derivative in the form of a sulfamic acid salt for use in the present invention, may be a conventional one. For example, there may be mentioned potato starch, corn starch, wheat starch and tapioca starch, as well as the oxidized starches, hydrolyzed starches, etc. of the said starches.

The quaternary ammonium sulfamates of the above-mentioned formulae (IV) and (V) are used in the reaction with the above-mentioned strach. These quaternary ammonium sulfamates can be represented by the above-mentioned general formula (II). The reaction between the said quaternary ammonium sulfamate and starch may proceed either in the presence of a small amount of a solvent or in the presence of a large amount of a solvent, and in particular, this preferably proceeds in an alkaline reaction system. As the solvent for use in the reaction, there may be mentioned water, hydrophilic organic solvents such as methanol, ethanol, isopropanol, butanol or other ethers, ketones, etc., and a mixed solvent comprising water and the said hydrophilic organic solvent, etc. Especially preferred solvents are water and a mixed solvent comprising water and ethanol, isopropanol or the like. In particular, the preferred mixed solvent comprises one weight part of water and form 0.01 to 100 parts by weight of ethanol, isopropanol or the like. In general, as the starch to be used in the reaction contains water in an amount of from 10 to 20% by weight or so, the said water can be utilized as a part of the above-mentioned reaction solvent. When the quaternary ammonium sulfamate of the said fromula (IV) is used in the above-mentioned reaction, it is preferred that the reaction is carried out in the presence of a relatively large amount of an alkaline substance. Preferred examples of the alkaline substances include alkali metal hydroxides such as sodium hydroxide, potassium hydroxide, etc. Regarding the amount of the alkaline substance which is to be present in the said reaction, when the quaternary ammonium sulfamate of the said formula (IV) is used, the alklaine substance is preferably from 0.5 to 10 mols or so per mol of the said sulfamate; but when the quaternary ammonium sulfamate of the said formula (V) is used, the alkaline substance is preferably from 0.1 to 2 mols or so per mol of the said sulfamate. In this reaction, the amount of the solvent to be used is preferably from 0.1 to 20 times by weight of the starch as being used. Generally the reaction can be finished, in the presence of the above-mentioned alkaline substance and solvent and at 100° C. or below, within from 0.5 to 24 hours or so, preferably at from 25° to 80° C. within from 1 to 20 hours or so.

By the above-mentioned reaction, the cationic starch ether derivative of the above-mentioned formula (I), which has an ether bond and which is in the form of a sulfamic acid salt, is formed. After the completion of the reaction for the formation of the said derivative, an acid may be added, if desired, to the reaction system so that the product is neutralized to the range between weak acid and neutral, and then optionally the said product can be purified by washing with a washing medium such as water, etc. After the completion of the above-mentioned reaction, the product is directly or after neutralized, after washed or after neutralized and then washed, dried so that the product can be obtained also in the form of a powder.

When the cationic starch ether derivative which is in the form of a sulfamic acid salt and which can be obtained as mentioned above is used as an additive to the papermaking stock, prior to the sheet-formation step, in accordance with the method of the present invention, the ether bond substitution as represented by the above-mentioned formula (I) is from 0.01 to 0.1, and especially preferably from 0.015 to 0.07. The said degree of substitution is defined by the proportion of the number of hydroxyl groups substituted by the ether bond to the number of the glucose units in the starch molecule, and the adjustment of the degree of substitution can be effected by the control of the above-mentioned reaction condition. For example, the degree of substitution can be elevated by the elevation of the proportion of the quaternary ammonium sulfamate of the formula (II) to the starch in the above-mentioned reaction, or by the prolongation of the reaction time when the reaction is carried out at a determined temperature, or by the elevation of the reaction temperature when the reaction is carried out for a determined reaction period. In order to obtain the intended cationic starch ether derivative of the formula (I) having a degree of substitution of from 0.01 to 0.1, the quaternary ammonium sulfamate of the formula (II) is preferred to be reacted with the starch in a molar amount larger than that corresponding to the intended degree of substitution but smaller than 10 times of the said molar amount, under the above-mentioned preferred condition of the solvent amount, alkaline substance, reaction temperature, reaction time, etc.

When the cationic starch ether derivative which has a degree of substitution of from 0.01 to 0.1 and which is in the form of a sulfamic acid salt, thus obtained as mentioned above, is used as an additive to be added to the papermaking stock prior to the sheet-formation step, in accordance with the method of the present invention, this is subjected to cooking treatment before this is added to the stock. The cooking treatment is carried out in water containing the said starch ether derivative in a concentration of from 0.1 to 1.0% by weight or so, preferably from 0.3 to 0.7% by weight or so, at a temperature higher than the gelatinization temperature of the said derivative but lower than the decomposition temperature thereof. For example, the said treatment can sufficiently be carried out at 100° C. for 10 to 20 minutes. The period of the cooking time may be shorter with the elevation of the cooking temperature. By the cooking treatment, a viscous and transparent paste of the said starch ether derivative can be obtained.

The above-mentioned cationic starch ether derivative which is in the form of a sulfamic acid salt can be used together with any other cationic substance such as cationic polyacrylamide derivatives, alumina sol, basic aluminium chloride, cationic silica sol, etc., in the practice of the present invention.

It is apparent that the improvement of the papermaking method by the present invention depends upon the property of the cationic starch ether derivative which has a degree of substitution of from 0.01 to 0.10 and which is in the form of a sulfamic acid salt, the said derivative being able to be obtained as mentioned above. In particular, when the said derivative is added to a papermaking stock and the stock is then subjected to sheet-formation step, an extremely high retention can be attained. It is believed that the said improvement of the retention is caused by the action of the said cationic starch ether derivative on the surface of the cellulose fiber or on the surface of the said fiber and on the surface of the inorganic filler in the papermaking stock whereby the fibers and the filler grains would flocculate by the strong action of the said derivative. It is surprising that the addition of the above-mentioned cationic starch ether derivative of the present invention, which is in the form of a sulfamic acid salt, is effective for remarkably elevating the retention in the sheet-formation step, as opposed to the best product of the conventional cationic starch ether derivatives which are in the form of a hydrochloric acid salt. It is not easy but difficult to physically clarify the said effect and so the mechanism of the said effect has not sufficiently been clarified. However, it is believed that the cationic starch ether derivative which is in the form of a sulfamic acid salt would form a specific colloid solution in an aqueous solution of electrolyte so that the resulting solution would have a high flocculating action to the anionic particles. This is because, when the particle size of the above-mentioned cationic starch ether derivative, which is in the form of a sulfamic acid salt, in the cooked solution was measured in a 0.01 wt. % aqueous NaCl solution containing 0.01% by weight of the said starch ether derivative by a dynamic light-scattering method, all the starch ether derivatives which were effective for the improvement of the retention had a particle size of from 400 to 2000 milimicrons, while the particle size of the cationic starch ether derivative which was obtained by the same method and which is in the form of a hydrochloric acid salt was measured to be from 300 to 400 milimicrons by the same dynamic light-scattering method.

Regarding the degree of substitution of the above-mentioned cationic starch ether derivative which is in the form of a sulfamic acid salt and which is to be added to the papermaking stock in accordance with the method of the present invention, if the derivative as used has a substitution degree of less than 0.01, the retention in the sheet-formation step could not be improved. On the other hand, the derivative having a degree of substitution of more than 0.1 is unfavorable since the manufacture cost of the derivative is high. Regarding the amount of the cationic starch ether derivative to be added to the papermaking stock, if the said amount is less than 0.05% by weight of the cellulose fiber or the total of the said fiber and the inorganic filler in the stock, the retention in the sheet-formation step could not be improved. On the other hand, even if the said amount is more than 5.0% by weight, the improvement of the retention in the sheet formation step would not be so remarkable but the manufacture cost of the final product papers would be high. Accordingly, the cationic starch ether derivative which is in the form of a sulfamic acid salt and which is to be added to the papermaking stock prior to sheet-formation, so as to improve the retention in the sheet-formation step, most preferably has a degree of substitution of from 0.015 to 0.07, and the amount of the said derivative to be added to the papermaking stock is most preferably from 0.1 to 3.0% by weight of the cellulose fiber or the total of the said fiber and the inorganic filler in the stock. As the cationic starch ether derivative to be used, which is in the form of a sulfamic acid salt, that of the above-formula (I) in which $R_1$, $R_2$ and $R_3$ all represent methyl groups is most preferred, since the manufacture of the said derivative is easy and the manufacture cost is low.

Regarding the anionic silica sol which may be used in combination with the above-mentioned cationic starch ether derivative, which is in the form of a sulfamic acid salt, if the particle size of the colloidal silica is 2 milimicrons or less, the production of papers of constant paper quality would become difficult since the sol itself is poor in the stability. On the other hand, if the particle size of the said colloidal silica is larger than 10 milimicron, such colloidal silica is not so effective for the improvement of the retention in the sheet-formation step. Accordingly, the silica sol which can give an especially high retention is a dispersion containing a colloidal silica of from 2 to 10 milimicrons size as stably dispersed in water. The amount of the sol to be added to the papermaking stock is preferably from 0.01 to 5.0% by weight, as $SiO_2$ of the sol, cf the cellulose fiber or the total of the said fiber and the inorganic filler in the papermaking stock. If the said amount is less than 0.01% by weight, or more than 5.0% by weight, the retention in the sheet-formation step could not be improved sufficiently. When bentonite or the above-mentioned anionic polymer is used in place of the silica sol, the amount thereof is also preferably from 0.01 to 5.0% by weight. The combined addition of the cationic derivative and the anionic component is effective not only for the improvement of the retention but also for the extreme improvement of the drainage. In particular, the use of the silica sol is most effective. The ratio of the anionic component to the cationic starch ether derivative which is in the form of a sulfamic acid salt most preferably falls within the range of from 0.002 to 20 parts by weight to one part by weight of the said starch ether derivative. Regarding the order of the cationic starch ether derivative which is in the form of a sulfamic acid salt and the anionic component to be added to the papermaking stock, in the case of the said combined addition system, the order is not limitative but anyone of the said cationic derivative and anionic component can be added first to the stock. The improvement by the combined addition is believed to result from the composite agglomerate of cellulose fiber-filler-starch ether derivative-anionic component and from the high flocculating force of the said composite agglomerate in the papermaking stock.

The improvement of the retention in the sheet-formation step in the papermaking industry, in particular, the improvement of the retention of the fine components in the papermaking stock results in the reduction of the cost of the white water treatment; and the improvement of the drainage results in the elevation of the filtration speed thereby to elevate the paper producing speed and this contributes to the economization of the necessary heat energy and the rapid procedure in the dewatering and the drying step. Moreover, the improvement of the paper quality is effective not only for the improvement of the paper products themselves but also for the employability of raw materials of low quality or of the combination of raw materials of low quality and raw materials of high quality if the paper products which are equivalent to conventional products are required to be produced. In addition, the sulfamate ion has a remarkably low corroding capacity as compared with chloride ion, and therefore, the method of the present invention using the former sulfamate ion can overcome the problem of the corrosion of apparatus, etc. to be used in the papermaking industry.

Furthermore, since the cationic starch ether derivative which is in the form of a sulfamic acid salt may display an extremely high flocculating force, as mentioned above, as compared with the conventional starch ether derivative which is in the form of a hydrochloride salt and which has heretofore been used in conventional papermaking, it is apparent that the former derivative which is in the form of a sulfamic acid salt can be utilized not only in the papermaking industry but also in any other industrial fields which will require such high flocculating capacity, for example, as a flocculating agent for purification of water, a flocculating agent for shaping of inorganic fibers, etc. In addition, since the starch ether derivative which is in the form of a sulfamic acid salt is a polymer electrolyte, it would easily be understood that this can be utilized also as an antistatic agent.

Examples and comparative examples are mentioned hereunder by way of concrete illustration of the present invention, which, however, are not intended to limit the technical scope of the present invention.

EXAMPLE 1

Production and Analysis of Quaternary Ammonium Sulfamate (A) : Production of 3-Chloro-2-hydroxypropyl-trimethylammonium Sulfamate A thermometer, a condenser, a dropping funnel and a magnetic stirrer were equipped to a 500 ml reaction flask, and 92.3 g (0.95 mol) of a crystalline sulfamic acid was put therein, and then 211.1 g (1.0 mol) of a 28 wt. % aqueous solution of trimethylamine was dropwise added thereto with cooling at 5° to 15° C. The pH value of the reaction solution showed weak alkaline. Next, 101.8 g (1.1 mols) of epichlorohydrin was dropwise added to the flask over one hour, with stirring, and then the reaction mixture was kept at 20° to 30° C. and ripened for 1.2 hours. The termination of the reaction was confirmed by ion chromatographic analysis.

Next, the reaction mixture was subjected to heat-topping treatemnt under pressure of from 80 to 100 mmHg, while 1000 g of water was continously or batch-wise added to the reaction flask, and at last, the weight of the reaction solution was adjusted to 435 g. The resulting colorless transparent aqueous solution was analyzed by ion chromatographic analysis, to the folowing result.

| | | |
|---|---|---|
| $NH_2SO_3^{\ominus}$ | 2.14 | mmol/g |
| $Cl^{\ominus}$ | 0.046 | mmol/g |
| $Cl-CH_2-\overset{OH}{\underset{}{CH}}-CH_2-\overset{CH_3}{\underset{CH_3}{\overset{|}{N}}}-CH_3^{\oplus}$ | 2.01 | mmol/g |
| $\overset{O}{\overset{/\ \backslash}{CH_2-CH}}-CH_2-\overset{CH_3}{\underset{CH_3}{\overset{|}{N}}}-CH_2^{\oplus}$ | 0.046 | mmol/g |
| $CH_3-\overset{CH_3}{\underset{CH_3}{\overset{|}{N}}}-H^{\oplus}$ | 0.13 | mmol/g |

From the said result, the composition of the product was calculated as follows:

| | |
|---|---|
| 3-Chloro-2-hydroxypropyl-trimethyl-ammonium Sulfamate | 50% by weight |
| 2,3-Epoxypropyltrimethylammonium Chloride | 0.7% by weight |
| Triemthylammonium Sulfamate | 2.0% by weight |

(B) : Production of 2,3-Epoxypropyl-trimethylammonium Sulfamate 435 g of a 50 wt. % aqueous solution of the 3-chloro-2-hydroxypropyltrimethylammonium sulfamate obtained in the above-mentioned Example 1 (A) was condensed at 60° C. under reduced pressure to obtain 272 g of a condensed colorless transparent solution. While the said condensed solution was vigorously stirred at 12° to 15° C., 80 g (0.9 mol) of a 45 wt. % aqueous solution of sodium hydroxide was dropwise added thereto over 40 minutes, and then the whole was kept at 15° to 20° C. for further 60 minutes. At the termination of the reaction, the pH value of the reaction mixture was 9.

Next, the insoluble substances were taken out by filtration, and thus 244 g of a viscous colorless transparent solution was obtained. This was then treated at 60° C., 5 mmHg for 2 hours for removal of the solvent therefrom, to give 178.5 g of a white cloudy viscous product. This white cloudy viscous product was analyzed by ion chromatographic analysis to the following result.

| | | |
|---|---|---|
| $NH_2SO_2^{\ominus}$ | 4.48 | mmol/g |
| $Cl^{\ominus}$ | 0.11 | mmol/g |
| $Cl-CH_2-\overset{OH}{\underset{}{CH}}-CH_2-\overset{CH_3}{\underset{CH_3}{\overset{|}{N}}}-CH_3^{\oplus}$ | 0.14 | mmol/g |
| $\overset{O}{\overset{/\ \backslash}{CH_2-CH}}-CH_2-\overset{CH_3}{\underset{CH_3}{\overset{|}{N}}}-CH_3^{\oplus}$ | 4.43 | mmol/g |

From the said result, the composition of the product was calculated as follows:

| | |
|---|---|
| 2,3-Epoxypropyltrimethylammonium Sulfamate | 92% by weight |
| 2,3-Epoxypropyltrimethylammonium Chloride | 2.0% by weight |
| 3-Chloro-2-hydroxypropyltrimethyl-ammonium Sulfamate | 3.4% by weight |

Further, 108 g of the filtered residue was washed with water. As the washed solution contained 2,3-epoxypropyltrimethylammonium sulfamate, etc., the improvement of the yield could further be attained by the recovery of the product from the washed solution.

(C) : Analysis of Quaternary Ammonium Salt by Ion Chromatography

Analytic Apparatus Used

Ion Chromatography Detector by Toso KK (Japan), Conductometer Type CM-8000.

Cation Analysis

Column: TSK-gel, IC-cation-SW
Eluent: 20 mM nitric acid, 30% acetonitrile-aqueous solution Anion Analysis Column: TSK-gel IC-anion-PW
Eluent: 2.5 mM phthalic acid-aqueous solution
Identification and quantitative determination were carried out on the basis of the respective standard salts.

EXAMPLE 2

Production and Analysis of Starch Ether Derivative (a) Organic Solvent Method 112 g of isopropyl alcohol, 20 g of water and 58 g of potato starch were put in a glass reactor having a stirrer and uniformly dispersed, and then 6.5 g of a 50 wt. % aqueous solution of the 3-chloro-2-hydroxypropyltrimethylammonium sulfamate obtained in the above-mentioned Example 1 (A) was added thereto with stirring. Further, 3.6 g of a 45 wt. % sodium hydroxide-aqueous solution was added and the whole was strired and reacted at 60° C. for 4 hours. Next, the reaction mixture was cooled and filtered, and the resulting cake was sufficiently washed with 100 g of isopropyl alcohol and dried under reduced pressure to obtain 58.5 g of a starch ether derivative (CS-1).

(b) Organic Solvent Method

In the same manner as the above-mentioend Example 2 (A), except that 58 g of tapioca starch was used in place of the potato starch, 58.0 g of a starch ether derivative (CS-2) was obtained.

(c) Wet Method 74 g of water and 9.2 g of sodium sulfate were put in a glass reactor having a stirrer and dissovled at 30° C., and then 103.3 g of potato starch was added thereto and uniformly dispersed. Next, 10.4 g of a 50 wt. % aqueous solution of the 3-chloro-2-hydroxypropyltrimethylammonium sulfamate obtained in the previous Example 1 (A) was added and further 12.7 g of a 10 wt. % sodium hydroxide-aqueous solution was added, and then the whole was heated up to 50° C. and reacted for 20 hours with stirring. After cooled, the reaction solution was neutralized to pH 6.8 with hydrochloric acid, and then 20 g of water was added and the resulting solution was filtered under suction. The resulting cake thus obtained was dried under reduced pressure, to obtain 108 g of starch ether derivative (CS-3).

(d) Wet Method

In the same manner as the previous Example 2 (c), except that 4.5 g of the 2,3-epoxypropyltrimethylammonium sulfamate obtained in the previous Example 1 (B) was used in place of the 3-chloro-2-hydroxypropyltrimethylammonium sulfamate obtained in the Example 1 (A), 105 g of a starch ether derivative (CS-4) was obtained.

(e) Wet Method 150 g of tapioca starch, 200g of water, 10.0 g of a 50 wt. % aqueous solution of the 3-chloro-2-hydroxypropyltrimethylammononium sulfamate obtained in the previous Example 1 (A) and 13 g of a 23 wt. % sodium hydroxide-aqueous solution were put in a glass reactor having a stirrer, and the whole was stirred for 24 hours while the temperature of the reaction mixture was kept to be 40° C. Afterwards, hydrochloric acid was added and the pH value of the reaction mixture was adjusted to be 5. Next, the reaction mixture was filtered under suction and washed with water, and the thus-formed cake was dried under reduced pressure to obtain 138 g of a starch ether derivative (CS-5).

(f) Wet Method 114 g of corn starch, 150 g of water, 5.3 g of the 2,3-epoxypropyltrimethylammonium sulfamate obtained in the previous Example 1 (B) and 32 g of a 5 wt. % sodium hydroxideaqueous solution were put in a glass reactor having a stirrer and stirred for continuous 4 hours while the temperature of the reaction mixture was kept at 60° C.

Next, after the said reaction mixture was cooled, hydrochloric acid was added thereto so as to adjust the pH value to 5, and then the mixture was filtered under suction, washed with water and then dried under reduced pressure, to obtain 110 g of a starch ether derivative (CS-6).

(g) Wet Method 58 g of corn starch, 700 g of water and 2 g of a 12 wt. % aqueous solution of sodium hypochlorite were put in a glass reactor having a stirrer and heated with stirring. After the temperature of the reaction mixture reached 50° C., the whole was continuously stirred for 1 hour at the said temperature. Afterwards, 10 g of a 45 wt. % sodium hydroxide-aqueous solution was added and the whole was continously strired for further one hour, while the temperature of the said reaction mixture was kept at 50° C.

Next, the said reaction mixture was cooled to 40° C., and then 6 g of a 50 wt. % aquoeus solution of the 3-chloro-2-hydroxypropyltrimethylammonium sulfamate obtained in the previous Example 1(A) was added thereto, and the whole was continuously stirred for 30 minutes while the temperature of the said reaction mixture was kept at 40° C. Afterwards, the said reaction mixture was cooled, and then hydrochloric acid was added thereto so that the pH value of the resulting reaction mixture was adjusted to 5. Then, the mixture was filtered under suction, washed with water and dried under reduced pressure, to obtain 56 g of a starch ether derivative (CS-7).

(h) Dry Method 25 of potato starch was put in an automatic mortar, and while kneaded with a pestle at room temperature, 2.0 g of a 50 wt. % aqueous solution of the 3-chloro-2-hydroxypropyltrimethylammonium sulfamate obtained in the previous Example 1 (A) was dropwise added thereto and continuously stirred for 30 minutes, and then 0.63 g of a 44 wt. % sodium hydroxide-aqueous solution was dropwide added and further kneaded for 25 minutes at room temperature. Next, the powdery reaction mixtrue was transported into a galss container and ripened for 4 hours at 70° to 75° C. therein Afterwards, this was washed with 50 g of a mixture solution of water/methanol (1/1, by volume), filtered and dried, to obtain 26 g of a starch ether derivative (CS-8).

(i) Dry Method

In the same manner as the previous Example 2 (h), except that the amount of the 50 wt. % aqueous solution of the 3 chloro-2-hydroxypropyltrimethylammonium sulfamate obtained in Example 1 (A) was varied to 1.5 g and that the amount of the 44 wt. % sodium hydroxide-aqueous solution was varied to 0.47 g, 25 g of a starch ether derivative (CS-9) was obtained.

COMPARATIVE EXAMPLE 1

Production of Starch Ether Derivative (j) Organic Solvent Method

In the same manner as the previous Example 2 (a), except that 4.8 g of a 50 wt. % aqueous solution of a commercial product 3-chloro-2-hydroxypropyltrimethylammonium chloride was used in place of the 50 wt. % aqueous solution of the 3-chloro-2-hydroxypropyltrimethylammonium sulfamate obtained in Example 1 (A), 58.3 g of a starch ether derivative (CS-10) was obtained.

(k) Wet Method

In the same manner as the previous Example 2 (c), except that 7.8 g of a 50 wt. % aqueous solution of a commercial product 3-chloro-2-hydroxypropyltirmethylammonium chloride was used in palce of the 50 wt.% aqueous solution of the 3-chloro-2-hydroxypropyltrimethylammonium sulfamate obtained in Example 1 (A), 109 g of a starch ether derivative (CS-11) was obtained.

(l) Dry Method

In the same manner as the previous Example 2 (h), except that 2.5 g of a 50 wt. % aqueous solution of a commercial product 3-chloro-2-hydroxypropyltrimethylammonium chloride in place of the 50 wt. % aqueous solution of the 3-chloro-2-hydroxypropyltrimethylammonium sulfamate obtained in Example 1 (A) and 1.04 g in place of 0.63 g of a 44 wt. % sodium hydroxide-aqueous solution were used, 26 g of a starch ether derivative (CS-12) was obtained.

(m) Measurement of Substitution Degree of Starch Ether Derivative

The substitution degree means the proportion of the number of the hydroxyl groups substituted by the ether bond in the starch molecule to the number of the glucose units in the starch molecule, and this can be obtained by analysis of the total nitrogen in the starch ether derivative. For the analysis of the total nitrogen, Total Nitrogen Analyzer TN-02 (by Mitsubishi Chemical Co., Japan) was used. All the above-mentioned (CS-1) through (CS-12) were analyzed, and the substitution degrees of the respective derivatives calculated are shown in Table 1 below.

(n) Preparation of Cooked Starch Ether Derivative Solution 2.0 g of each of the twelve starch ether derivatives of the above-mentioned (CS-1) through (CS-12) was added to 400 g of water and cooked for 20 minutes at 100° C. with stirring. After cooled, the concentration was regulated, and thus a 0.5 wt. % starch ether derivative-cooked solution was obtained.

(o) Measurement of Particle Size of Starch Ether Derivative

Each of ten kinds of the above-mentioned cooked solutions was dissolved in a 0.01 wt. % NaCl solution in a concentration, as the starch ether derivative, of 0.01% by weight, and the particle size of the starch ether derivative in the resulting solution was measured by the use of an apparatus for measuring the dynamic light-scattered particle size. The said apparatus is called $N_4$ (by Coulter Electronics Inc., USA). The results obtained are shown in Table 1 below.

(3) After 30 seconds, an anionic silica sol, anionic polymer or bentonite is added.

(4) After further 15 seconds, the drainage is started, and the white water as drained is collected for 30 seconds. The amount of the white water as drained for the said period of time is X ml.

(As the metal screen, a sheet-formation screen of 200 mesh was used and the hole diameter of the glass tube was adjusted so that the flow amount for 30 seconds was almost 100 ml.)

(5) The white water thus drained was filtered through a determination filter paper (5C, by Toyo Filter Paper Co., Japan) whose dry weight at 105° C. ($W_1$ g) was previously measured, and then the paper was dried at 105° C. and the weight (filter paper+fine components) is measured. The thus measured weight is $W_2$ g.

(6) The weight (%) of the total fine components (fine pulp+filler) in the original pulp slurry is previously obtained by a different method. The value of the % by weight is F %.

(7) The retention of the fine components is calculated by the following formula:

$$\text{Retention of Fine Components (wt. \%)} = \frac{C \times F - \frac{10000}{X}(W_2 - W_1)}{C \times F} \times 100$$

TABLE 1

| Starch Ether Derivative | Starch Material | Production Method | Degree of Substitution | Dynamic Light-Scattered Particle Size (mµ) |
|---|---|---|---|---|
| Examples | | | | |
| (CS-1) | Potato | Organic Solvent Method | 0.041 | 1540 |
| (CS-2) | Tapioca | Organic Solvent Method | 0.042 | 1520 |
| (CS-3) | Potato | Wet Method | 0.025 | 695 |
| (CS-4) | Potato | Wet Method | 0.020 | 644 |
| (CS-5) | Tapioca | Wet Method | 0.024 | 780 |
| (CS-6) | Corn | Wet Method | 0.030 | — |
| (CS-7) | Oxidized Corn | Wet Method | 0.030 | — |
| (CS-8) | Potato | Dry Method | 0.025 | 780 |
| (CS-9) | Potato | Dry Method | 0.019 | 608 |
| Comparative Examples | | | | |
| (CS-10) | Potato | Organic Solvent Method | 0.038 | 353 |
| (CS-11) | Potato | Wet Method | 0.021 | 317 |
| (CS-12) | Potato | Dry Method | 0.042 | 408 |

EXAMPLE 3 AND COMPARATIVE EXAMPLE 2

(A) : Preparation of Pulp Slurry 90 g of a softwood bleached kraft dry pulp and 270 g of a hardwood bleached kraft dry pulp were added to 25 kg of water and left as such for one full day, and this was beaten with a laboratory beater to the Canadian standard freeness (CSF) of 350 ml, to prepare a pulp slurry.

(B) : Measurement of retention

The measurement of the retention was effected in accordance with Dynamic drainage jar (Britt-jar) Test Method (Britt, K. W.: Tappi, 56 (10) 46–50, 1973).

The concrete procedure for the measurement comprises the following steps:

(1) 500 ml of a pulp slurry is put in a jar and stirred at 800 rpm. The accurate dry solid concentration (pulp+filler) in the pulp slurry is C % by weight.
(2) To this is added a cooked starch ether derivative, and the measurement of time is started.

(C) : Measurement of Paper Strength

A hand-sheet formed paper for physical test, which weighed 80 g/m², was prepared by the use of a TAPPI Standard Hand-sheet Forming Machine. The thus formed sheet was dried and cured in a forced hot air drying oven at 120±1° C. for 3 minutes. The artificial paper thus obtained was pre-treated by the method of JIS-P8111 Standard, and then the breaking length thereof was measured by the method of JIS-P8113 Standard. The paper strength is evaluated to be higher, when the breaking length of the paper tested is longer.

(D) : Papermaking

To the pulp slurry of the above-mentioned (A) were added aluminium sulfate, rosin sizing agent, kaolin (china clay), water and sulfuric acid, as a fixing agent, and thus a papermaking stock comprising 0.35% by weight of pulp concentration, 0.15% by weight of kaolin (china clay), 0.0035% by weight of aluminium sulfate (as 18-hydrate), 0.0015% by weight of rosin sizing agent and 43% by weight of the kaolin/pulp ratio and having pH 4.5 was prepared. The content of the fine components in the stock was 36% by weight.

Next, 5 g of the cooked solution of each of the starch ether derivatives (CS-1) to (CS-4) and (CS-8) to (CS-12), as prepared in the previous Example 2 (n), was added to 500 g of the said papermaking stock, with stirring, and the retention of the fine components was measured in every case. The results obtained are shown in Table 2 below. The results of Table 2 demonstrate that the retention of the examples of the present invention was noticeably superior to that of the comparative examples.

silica sol (formed by diluting a silica sol which had a silica concentration of 15.0% by weight, a pH of 9.8 and a particle size of 5.0 mµ to a silica concentration of 0.5% by weight) was added thereto. The retention of the fine components and the paper strength were also measured in the same manner as above. The results obtained are shown in Table 3 below. In this experiment, the ratio of starch ether derivative/(pulp+filler) was 1.0% by weight, and the ratio of anionic silica/(pulp+filler) was 0.3% by weight.

TABLE 3

| No. | Starch Ether Derivative Used | Retention of Fine Components (wt. %) | Paper Strength (Breaking length, km) | |
|---|---|---|---|---|
| | | | Dry State | Wet State |
| Example 4 | (CS-1) | — | 8.46 | 0.70 |
| | (CS-2) | 83.4 | 7.01 | 0.58 |
| | (CS-3) | 85.3 | 8.21 | 0.68 |
| | (CS-5) | 78.0 | 8.15 | 0.68 |
| | (CS-6) | 83.0 | — | — |
| | (CS-7) | 85.0 | — | — |
| | (CS-8) | 92.6 | 7.65 | 0.64 |
| Comparative Example 3 | | | | |
| | (CS-10) | 75.2 | 6.94 | 0.41 |
| | (CS-11) | — | 6.86 | 0.40 |
| | (CS-12) | 70.3 | 6.89 | 0.38 |

The results of Table 3 demonstrate that both the retention and the paper strength of the examples of the present invention were superior to those of the comparative examples.

TABLE 2

| No. | Starch Ether Derivative Used | Retention (wt. %) of Fine Components |
|---|---|---|
| Example 3 | (CS-1) | 59.6 |
| | (CS-2) | 47.8 |
| | (CS-3) | 59.6 |
| | (CS-4) | 51.5 |
| | (CS-8) | 46.7 |
| | (CS-9) | 42.1 |
| Comparative Example 2 | (CS-10) | 30.8 |
| | (CS-11) | 29.7 |
| | (CS-12) | 36.7 |

EXAMPLE 4 AND COMPARATIVE EXAMPLE 3

Heavy calcium carbonate, water and sulfuric acid were added to the pulp slurry of Example 3 (A), to prepare a papermaking stock comprising 0.35% by weight of pulp concentration and 0.15% by weight of heavy calcium carbonate (ratio of heavy calcium carbonate/pulp : 43% by weight) and having pH 7.10. The content of the fine components in the said stock was 36% by weight.

Next, 5.0 g of the cooked starch ether derivative solution of the previous Example 2 (n) was added to 500 g of the said papermaking stock (0.5 wt. %), with stirring, and then 1.5 g of a dilute solution of an anionic

EXAMPLE 5 AND COMPARATIVE EXAMPLE 4

To the pulp slurry of the above-mentioned (A) were added aluminium sulfate, rosin sizing agent, kaolin (china clay), water and sulfuric acid, as a fixing agent, and thus a papermaking stock comprising 0.35% by weight of pulp concentration, 0.15% by weight kaolin, 0.0035% by weight of aluminium sulfate (as 18-hydrate), 0.0015% by weight of rosin sizing agent and 43% by weight of kaolin/pulp ratio and having pH 4.5 was prepared. The content of the fine components in the stock was 36% by weight.

Next, 5.0 g of the cooked solution of the starch ether derivative of the previous Example 2 (n) was added to 500 g of the above-mentioned papermaking stock (0.5% by weight), with stirring, and then 1.5 g of a dilute solution of an anionic silica sol (formed by diluting a silica sol which had a silica concentration of 15.0% by weight, a pH of 9.8 and a particle size of 5.0 mµ to a silica concentration of 0.5% by weight) was added thereto. The retention of the fine components and the paper strength were also measured in the same manner as above. The results obtained are shown in Table 4 below.

The ratio of starch ether derivative/(pulp+filler) was 1.0% by weight, and the ratio of anionic silica/(pulp+filler) was 0.3% by weight.

TABLE 4

| No. | Starch Ether Derivative Used | Retention of Fine Components (wt. %) | Paper Strength (Breaking length, km) | |
|---|---|---|---|---|
| | | | Dry State | Wet State |
| Example 5 | (CS-1) | 59.6 | 8.51 | 0.65 |
| | (CS-2) | 56.6 | 7.67 | 0.58 |
| | (CS-3) | 64.1 | 8.68 | 0.66 |
| | (CS-4) | 59.9 | — | — |
| | (CS-5) | — | 8.21 | 0.62 |
| | (CS-8) | 54.4 | 8.00 | 0.61 |
| | (CS-9) | 53.2 | — | — |
| Comparative Example 4 | | | | |
| | (CS-10) | 43.8 | 6.82 | 0.39 |
| | (CS-11) | 38.7 | 6.84 | 0.39 |

TABLE 4-continued

| No. | Starch Ether Derivative Used | Retention of Fine Components (wt. %) | Paper Strength (Breaking length, km) Dry State | Wet State |
|---|---|---|---|---|
| | (CS-12) | 42.3 | 6.75 | 0.40 |

The results of Table 4 demonstrate that both the retention and the paper strength of the examples of the present invention were noticeably superior to those of the comparative examples.

EXAMPLE 6 AND COMPARATIVE EXAMPLE 5

The same process of the Example 5 and the Comparative Example 4 were repeated, except that talc was used as the inorganic filler, in place of kaolin (china clay), and the retention of the fine components was measured in the same manner. The results obtained are shown in Table 5 below.

TABLE 5

| No. | Starch Ether Derivative Used | Retention of Fine Components (wt. %) |
|---|---|---|
| Example 6 | (CS-2) | 64.6 |
| | (CS-8) | 68.6 |
| Comparative Example 5 | (CS-10) | 49.3 |
| | (CS-12) | 43.7 |

The results of Table 5 indicate that the samples of the examples of the present invention were noticeably superior to those of the comparative examples.

EXAMPLE 7 AND COMPARATIVE EXAMPLE 6

The same process of the Example 5 and the Comparative Example 4 were repeated, except that bentonite was used in palce of the anionic silica sol, and the retention of the fine components was measured in the same manner. The results obtained are shown in Table 6 below.

TABLE 6

| No. | Starch Ether Derivative Used | Retention of Fine Components (wt. %) |
|---|---|---|
| Example 7 | (CS-8) | 63.6 |
| Comparative Example 7 | (CS-10) | 48.5 |

The results of Table 6 indicate that the sample of the example of the present invnetion was noticeably superior to that of the comparative example.

EXAMPLE 8 AND COMPARATIVE EXAMPLE 7

The same process of the Example 5 and the Comparative Example 4 were repeated, except that the amount of the starch ether derivative was varied to 4.0 g, 5.0 g and 6.0 g, and the retention of the fine components was measured in the same manner. The results obtained are shown in Table 7 below and FIG. 1 attached hereto.

The ratio of starch ether derivative/(pulp+filler) was 0.8% by weight, 1.0% by weight and 1.2% by weight, respectively.

TABLE 7

| | | Retention (% by weight) | | |
|---|---|---|---|---|
| | Starch Ether | Amount of Starch Ether Derivative Added (wt. %) | | |
| No. | Derivative Used | 0.8 | 1.0 | 1.2 |
| Example 8 | (CS-1) | 55.5 | 59.6 | 69.5 |
| | (CS-2) | 52.5 | 56.6 | 67.5 |
| | (CS-3) | 61.5 | 64.1 | 74.5 |
| | (CS-4) | 56.6 | 59.9 | 65.5 |
| | (CS-8) | 53.5 | 54.4 | 61.5 |
| | (CS-9) | 46.0 | 53.2 | 53.0 |
| Comparative Example 7 | (CS-10) | 33.5 | 43.8 | 51.0 |
| | (CS-11) | 33.5 | 38.7 | 42.5 |
| | (CS-12) | 42.0 | 42.3 | 50.0 |

When neither the starch ether derivative nor the anionic silica sol was added to the papermaking stock, the retention of the fine components was only 13.5% by weight. In FIG. 1, this is shown by ⊗ in FIG. 1.

The results of Table 7 and FIG. 1 indicate that the examples of the present invention are noticeably superior to those of the comparative examples.

EXAMPLE 9 AND COMPARATIVE EXAMPLE 8

In the same manner as the preparation of the papermaking stock of the previous Example 5 and Comparative Example 4, except that the amount of the anionic silica sol was varied to be a ratio of anionic silica sol/(pulp+filler) of 0% by weight, 0.1% by weight, 0.3% by weight and 0.5% by weight and that the total concentration of the pulp component and the filler component was made to be 0.3% by weight, various kinds of papermaking stocks were prepared each in an amount of 1000 g, the stirring rotation for the preparation being 1000 rpm. Immediately after the preparation, the drainage of each sample was tested at 20° C. by the use of a Canadian Standard Freeness Tester. The results obtained are shown in Table 8 below.

TABLE 8

| | | Drainage (ml) | | | |
|---|---|---|---|---|---|
| | Starch Ether | Amount of Anionic Silica Sol Added (wt. %) | | | |
| No. | Derivative Used | 0 | 0.1 | 0.3 | 0.5 |
| Example 9 | (CS-1) | 495 | 542 | 583 | 570 |
| | (CS-2) | 502 | 550 | 591 | 580 |
| | (CS-3) | 500 | 548 | 590 | 582 |
| | (CS-4) | 498 | 546 | 587 | 580 |
| | (CS-5) | 492 | 540 | 580 | 571 |
| | (CS-8) | 480 | 534 | 579 | 570 |
| | (CS-9) | 469 | 510 | 550 | 540 |
| Comparative Example 8 | (CS-10) | 458 | 466 | 501 | 499 |
| | (CS-11) | 445 | 446 | 480 | 474 |
| | (CS-12) | 454 | 463 | 498 | 490 |

When neither the starch ether derivative nor the anionic silica sol was added to the papermaking stock, the drainage was 405 ml.

The results of Table 8 demonstrate that the examples of the present invention were noticeably superior to those of the comparative examples.

What is claimed is:

1. A method for preparation of a starch ether derivative as represented by formula (I)

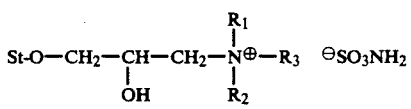

in which the degree of substitution of the ether bond is from 0.01 to 0.1, wherein a quaternary ammonium sulfamate of formula (II)

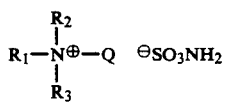

is reacted with a starch in a molar amount larger than the molar amount of the substituted ether bond of said starch derivative having the degree of substitution of from 0.01 to 0.1 but smaller than 10 times said molar amount of the substituted ether bond.

2. A method for preparation as claimed in claim 1, wherein $R_1$, $R_2$ and $R_3$ in the said formulae (I) and (II) are all methyl groups and Q in the said formula (II) is 3-chloro-2-hydroxypropyl group.

3. A method for preparation of a starch ether derivative as represented by formula (I)

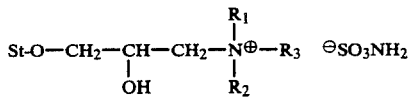

in which the degree of substitution of the ether bond is from 0.01 to 0.1, wherein a quaternary ammonium sulfamate of formula (II)

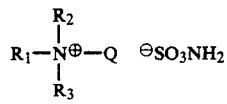

is reacted with a starch in a molar amount larger than the molar amount of the substituted ether bond of said starch derivative having the degree of substitution of from 0.01 to 0.1 but smaller than 10 times of said molar amount of the substituted ether bond, in the presence of an alkali metal hydroxide in an amount of from 0.1 to 10 times of the molar amount of said quaternary ammonium sulfamate and water or a mixed solvent comprising water and a water-soluble organic solvent in an amount of from 0.1 to 20 times the weight of said starch, at a temperature of from room temperature to 100° C.

4. A method for preparation as claimed in claim 3, wherein the alkali metal hydroxide is sodium hydroxide or potassium hydroxide.

5. A method for preparation as claimed in claim 3, wherein the mixed solvent is a mixture comprising one part by weight of ethanol, isopropanol or a mixture thereof and from 0.01 to 100 parts by weight of water.

6. A starch ether derivative of a general formula (I):

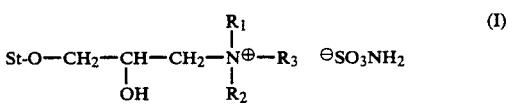

where St—O represents a starch molecule residue, $R_1$, $R_2$ and $R_3$ independently represent an alkyl group having from 1 to 18 carbon atoms or a benzyl group, provided that two or more of these $R_1$, $R_2$ and $R_3$ must not be a benzyl group or an alkyl group having from 5 to 18 carbon atoms at the same time, and any two of these $R_1$, $R_2$ and $R_3$ may be bonded to from a cyclic structure, said derivative containing the ether bond as represented by said formula.

7. A starch ether derivative as claimed in claim 6, wherein $R_1$, $R_2$ and $R_3$ in the formula (I) all are methyl groups.

8. A starch ether derivative as claimed in claim 6, which contains the ether bond as represented by the said formula (I) in a degree of substitution of from 0.01 to 0.1.

* * * * *